Patented Jan. 27, 1925.

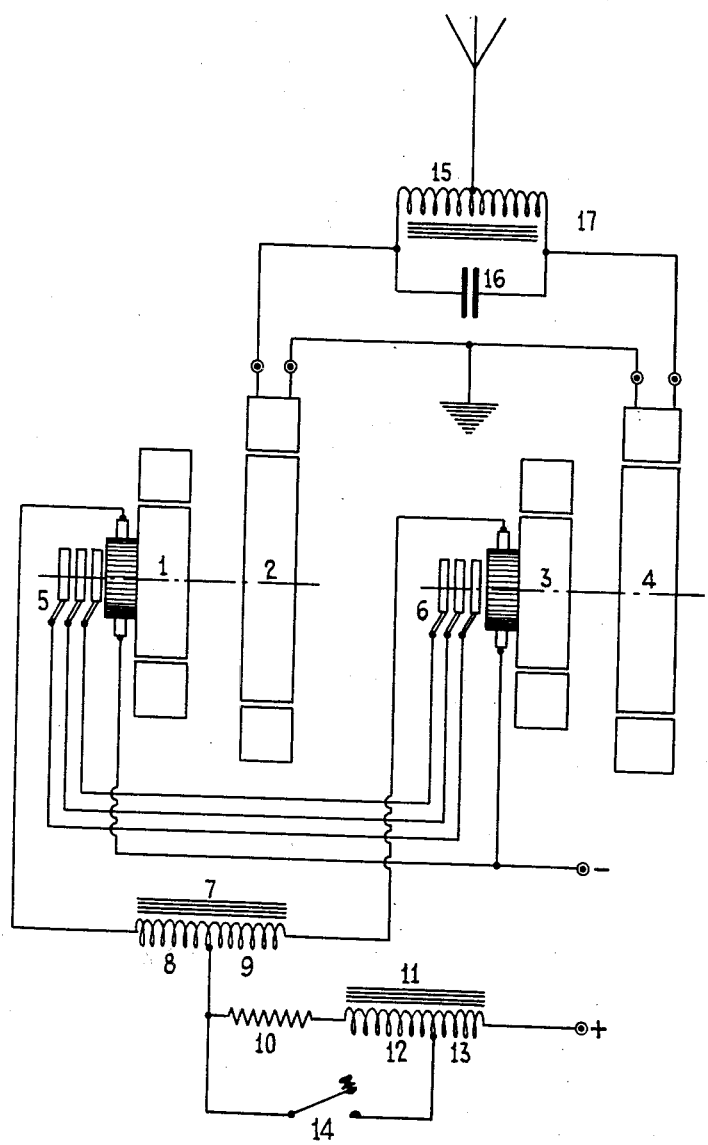

1,524,646

UNITED STATES PATENT OFFICE.

MARIUS LATOUR, OF PARIS, FRANCE.

CONNECTION OF HIGH-FREQUENCY ALTERNATORS FOR RADIOSIGNALING.

Application filed December 5, 1923. Serial No. 678,574.

*To all whom it may concern:*

Be it known that I, MARIUS LATOUR, a citizen of the Republic of France, and resident of Paris, France, have invented certain new and useful Improvements in Connections of High-Frequency Alternators for Radiosignaling, of which the following is a specification accompanied by drawings.

The present invention relates to improvements in the connections of high frequency alternators for wireless work. Its object is to balance the currents of the driving motors of the alternators coupled together, and to bring action, under particular conditions, upon the circuits of these motors.

The single figure of the drawing illustrates the arrangements adopted in conformity with the invention.

Direct-current motors 1 and 3 drive high frequency alternators 2 and 4 coupled together by auto-transformer 15 having a condenser 16 connected to its terminals.

It must first be remarked that, according to the spirit of the construction described, the transformer or auto-transformer 15 is furnished with a magnetic circuit 17 of iron, preferably torus-shaped; the two halves of the winding 15 are moreover intercalated turn by turn so as to reduce leakage between them; the compensation of magnetic force corresponding to leakage is thereby rendered unnecessary, while the reactance constituted by the assembly of coil 15, on the other hand, in virtue of the presence of iron, is made very high with the consequence that capacity 16 needs to be made only of minimum amount.

The direct current motors are coupled together in parallel by means of rings 5 and 6. It is clear that this coupling in itself adapted for machines working at 50 to 100 periods is unable to insure the coupling of alternators of 15-30000 periods which they drive. Still, in case of the alternators falling out of step, the chances of their being caused to come into step again by automatic means are necessarily greater. Furthermore, the coming in phase of the alternators is facilitated by the preliminary synchronization of the driving motors. This arrangement also is of real and practical interest in the case where the connection in series of alternators is dealt with.

The sets may, no matter what the particular circumstances, be started jointly without being coupled, In the case of a synchronous motor, the connections between the rings of the rotors will evidently be established in a similar manner.

To insure balanced load conditions between the motors, in the case of both direct current and alternating current it is feasible to arrange the motors in series; but in the particular case of direct current, recourse may be had to an inductance coil 7 with two windings 8 and 9. The production of an effective magnetic flux, in the case where the currents taken by the motors should fail to be equal, is opposed to the production differences in the value of the currents taken by the motors during control (key operation).

In French patent application No. 160,777, dated June 19, 1922, entitled "Improvements in speed regulation of high frequency generating sets for wireless telegraph" it has been pointed out that, in order to keep the speed of one high frequency set constant during control (key operation), a good plan is to provide a resistance in the armature circuit of the driving motor, and to short-circuit the same at the same time where load is being put on the high frequency alternator. Apart from this, per se, novel arrangement, it has been indicated in the same application for Letters Patent that, in order to obtain instantaneous variations of current in the armature of the motor, it is convenient to have recourse to mutual induction.

In the figure an arrangement is shown which eliminates the two actions. An ohmic (non-inductive) resistance 10 is arranged in series with an induction coil 11 comprising two windings 12 and 13. An operating key 14 short-circuits resistance 10 in series with the winding 12 at the very instant where load is put on the alternator. At no-load windings 12 and 13 are traversed by the current taken by the motor when idling. In the presence of load, only winding 13 is traversed by the current taken by the motor when carrying a load. One may proceed in a way such that the flux in inductance coil 11 has the same value whether there is no load or whether there is a load. Under these conditions, it is evident that the instantaneous establishment of stable or normal working conditions is promoted.

The compensation of the load of the motor by synchronous control or manipulation brought to act upon the armature current has been found more effective than the well-known action upon the field current, but it will be evident that the arrangement described comprising a resistance in series with an inductance consisting of two windings which works a constant flux for both the no-load and the load operating state of the condenser (an arrangement based upon the invention described in the application for the above-cited patent) applies equally to the case where synchronous action is brought either upon the field circuit of the motor, or upon the exciting circuit of the generator which feeds the motors, or else upon the direct current of a magnetic amplifier or a system of magnetic amplifiers in the case of drive by alternating current.

Having described my invention, what I claim is:

1. In a signaling system, the combination of a pair of alternators adapted to be operated in parallel, a pair of motors connected in parallel for driving the same, means for balancing the currents of said driving motors, comprising a self-inductance coil connected at opposite ends to said motors and at an intermediate point to one of the supply lines for said motors, means for compensating the changes in load of said alternators comprising a circuit including a resistance and a self-inductance, said inductance being arranged to operate at constant flux regardless of load conditions and means for short-circuiting said resistance and a portion of said inductance.

2. In a signaling system, the combination of a pair of alternators adapted to be operated in parallel, a pair of motors connected in parallel for driving the same, means for balancing the currents of said driving motors comprising a self-inductance coil connected at opposite ends to said motors and at an intermediate point to one of the supply lines for said motors, means for compensating the changes in load of said alternators comprising a resistance and an inductance in series with said supply line, said inductance being arranged to have a constant flux independent of load conditions and means for short-circuiting said resistance and a portion of said inductance.

3. In a radio signaling system, the combination of an antenna, a pair of alternators for energizing the same, said alternators being connected together through a coil having a magnetic core, said antenna being connected to the mid-point of said coil, a pair of motors for driving said alternators, said motors being arranged for parallel operation, means for balancing load current between said motors comprising a self-inductance coil having opposite ends connected to said motors and an intermediate point connected to means for compensating load of said alternator, said means comprising a resistance and an inductance in series, said inductance being arranged to operate at constant flux and means for short-circuiting said resistance and a portion of said inductance synchronously with changes of load.

MARIUS LATOUR.